United States Patent [19]
Albers et al.

[11] Patent Number: 5,402,232
[45] Date of Patent: Mar. 28, 1995

[54] SAMPLE AND HOLD CONTROL METHOD AND APPARATUS FOR IMPROVED SCALE FACTOR LINEARITY

[75] Inventors: Steven C. Albers, Shoreview, Minn.; Andrew J. Karpinski, Jr., Clearwater, Fla.

[73] Assignee: Honeywell Inc., Minneapolis, Minn.

[21] Appl. No.: 114,547

[22] Filed: Aug. 31, 1993

[51] Int. Cl.$^6$ .............................................. G01C 19/68
[52] U.S. Cl. .................................................... 356/350
[58] Field of Search ............................ 356/350; 372/94

[56] References Cited

U.S. PATENT DOCUMENTS

| | | |
|---|---|---|
| 3,373,650 | 3/1968 | Killpatrick . |
| 3,581,227 | 5/1971 | Podgorski . |
| 4,152,071 | 5/1979 | Podgorski ............................ 356/350 |
| 4,740,084 | 4/1988 | Curby et al. ........................ 356/350 |
| 4,915,492 | 4/1990 | Toth . |
| 5,148,076 | 9/1992 | Albers et al. . |

Primary Examiner—Samuel A. Turner
Attorney, Agent, or Firm—Craig J. Lervick

[57] ABSTRACT

A control method is disclosed which extends random drift improvement control to operation at high input rates. Traditional RDI control fails at high input rates due to the diminishing amplitude of the SBS; therefore, the control is lost. The present invention continuously samples the RDI control position and holds this RDI control position at its last previously recorded optimum value while the ring laser gyroscope is subjected to high input rates.

15 Claims, 3 Drawing Sheets

SAMPLE AND HOLD CONTROL METHOD AND APPARATUS FOR IMPROVED SCALE FACTOR LINEARITY

RELATED APPLICATIONS

This application is related to Honeywell application Ser. No. 07/682,840 (attorney docket number A3414732-US/15347-162) and Honeywell application Ser. No. 07/356,891 (attorney docket number A3415073-US/15347-166).

FIELD OF THE INVENTION

The present invention is related to the operation and performance of a ring laser gyroscope. More specifically, the present invention provides a control method for improved performance of a ring laser gyroscope by enhancing the gyroscope's scale factor linearity at high input rates or when conventional dithering is not applied.

BACKGROUND OF THE INVENTION

Ring laser angular rate sensors or ring laser gyroscopes are well known in the art for use in inertial navigation systems. Specifically, the ring laser gyroscope is used to sense annular rotation and thus communicate signals indicative of such rotation to subsequent systems. Ring laser gyroscope operation is further described in U.S. Pat. No. 3,373,650, issued to Killpatrick. Generally, the ring laser gyroscope is comprised of a block which supports two counterpropagating electromagnetic waves, or light beams or laser beams. Rotation of the ring laser gyroscope about an axis normal to the plane containing the counterpropagating light beams causes a phase change in these light beams. The phase change in the light beams is indicative of rotation and detection of this phase change produces a direct measurement of such rotation.

As is well known to those skilled in the art, performance is detrimentally effected by a condition known as lock-in. Lock-in occurs when the counterpropagating light beams approach one another in frequency and phase, causing the two beams to resonate together, thus losing their independence.

U.S. Pat. No. 4,152,071, issued to Podgorski and assigned to the Assignee of the present invention, teaches an apparatus to minimize lock-in by optimally positioning to laser beam path within the laser cavity. As disclosed in U.S. Pat. No. 4,152,071, it is first necessary to establish a pathlength control loop to maintain the laser beams at a maximum DC intensity. This pathlength control loop utilizes one mirror transducer to adjust the dimensions of the laser cavity.

To minimize lock-in and further improve the performance of the gyroscope, a lock-in control loop or Random Drift Improvement loop (RDI loop) is utilized to adjust the lasing path within the gyroscope cavity. Lasing path adjustment is accomplished by simultaneously moving two mirrors within the cavity. (Mirrors are moved using well known transducers such as those taught in U.S. Pat. No. 3,581,227 issued to Podgorski, U.S. Pat. No. 4,915,492 issued to Toth, or U.S. Pat. No. 5,148,076 issued to Albers et al.) For example, as one mirror is moved outward, a second mirror is moved inward. These mirrors are repositioned so as to minimize the Single Beam Signal (SBS). The SBS is the AC component of the laser intensity.

While the apparatus and control method disclosed in U.S. Pat. No. 4,151,071 does provide many improvements to the performance of the gyroscope, it will be recognized that the improvements will not be realized when the gyroscope is subject to high input rates or when dithering is not used. The SBS, which is used to control the RDI loop, is only modulated when the gyroscope nears a zero input rate. If the input rate exceeds the peak dither rate of the gyroscope, the gyroscope does not experience zero input. Furthermore, as the input rate increases, the magnitude of the SBS decreases. When the SBS decreases to a certain level, the RDI control loop cannot close, thus eliminating the purpose of this control.

SUMMARY OF THE INVENTION

It is an object of the present invention to provide a control method for improving the scale factor of linearity of a ring laser gyroscope. This object is particularly applicable when it is anticipated that the ring laser gyroscope will observe very high input rates.

It is a further object of the present invention to extend the traditional principles of random drift improvement to situations where the ring laser gyroscope is subjected to very high input rates.

It is another object to extend these ideas to situations where conventional dither mechanisms are disabled.

Lastly, it is an object of the present invention to improve the factory yield when building ring laser gyroscopes by providing a method to improve the performance characteristics of the ring laser gyroscope. By utilizing this method to improve characteristics of the ring laser gyroscope, performance specifications can be more easily met.

The present invention extends RDI control when the ring laser gyroscope is subjected to high input rates. As the ring laser gyroscope reaches a level where its input rate approaches and goes beyond the maximum dither rate (the maximum rate of rotation at which the dither motor drives the ring laser gyroscope), it is recognized that dithering is no longer needed and the dither motor can be disabled. However, at this high input rate the SBS is lost. Therefore, the last RDI control position is sampled and held during the period at which the ring laser gyroscope is subjected to high input rates. The method of control comprises an initialization period at which time the gyro is energized, pathlength control is established and RDI control is established. These control positions are sampled and when the ring laser gyroscope is subjected to high input rates, the RDI control position is held constant.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

As is well known in the art, control circuitry is generally associated with a ring laser gyroscope to provide random drift improvement control, or lock-in control. The general idea of random drift improvement, or lock-in control, is well known in the an and is further explained in U.S. Pat. No. 4,152,071.

Figure 1:
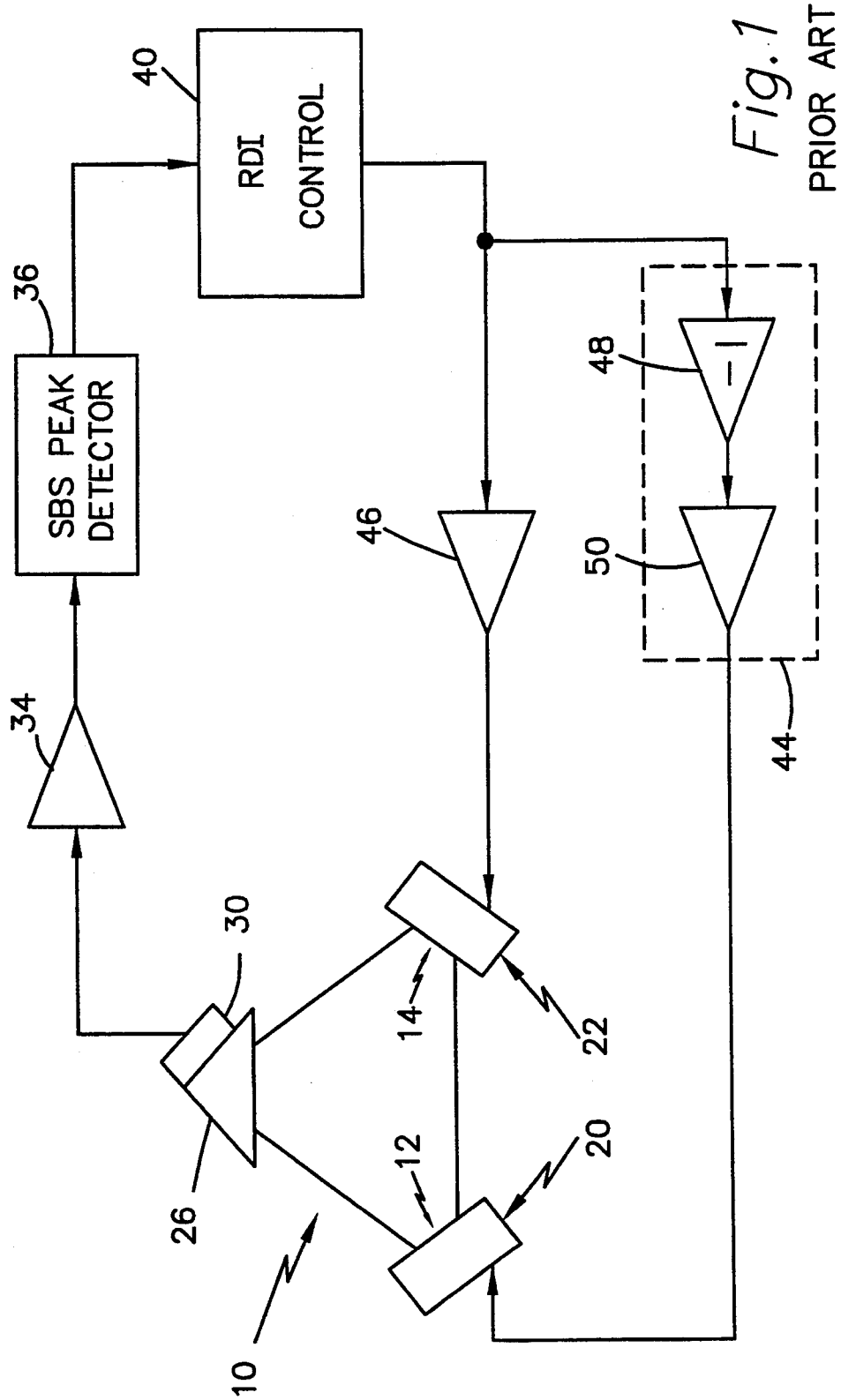
FIG. 1 is a diagram of typical control circuitry for the pathlength control and random drift improvement control.

Referring now to FIG. 1, there is shown a block diagram illustrating the idea of random drift improvement control. A ring laser gyro block 10 is shown which supports two counterpropagating light beams. Upon a first corner 12 and a second corner 14 of ring laser gyro block 10 are attached a first transducer 20 and a second transducer 22. Different types of transducers can be used for first transducer 20 and second transducer 22, both of which are well known in the art. At a third corner 16 of ring laser gyro block 10 is a readout 30 and combiner prism 26. The combiner prism 26 is a mechanism to combine the two counterpropagating light beams to extract useful information therefrom. The details of the combiner prism 26 are beyond the scope of the present invention.

Attached to combiner prism 26 is an optical sensor 30. The optical sensor 30 detects a single counterpropagating lightwave within the laser gyro block 10 and outputs an electrical signal indicative of this optical signal. Optical sensor 30 detects both DC and AC components of the single lightwave within the laser gyro block 10. The DC component is referred to as the laser intensity and the AC component is referred to as the Single Beam Signal, or SBS. The output 32 of optical sensor 30 is transmitted to an amplifier 34 which has its output transmitted to an SBS peak detector 36. SBS peak detector 36 detects the peak strength of the SBS and outputs a signal to an RDI control circuit 40 which is indicative of the amplitude of the SBS.

In some situations, two optical sensors are used to detect the characteristics of each counterpropagating lightwave. These two signals are then combined to create a composite SBS signal. This composite SBS signal can then be used as an input to RDI control circuit 40. The SBS signal must simply indicate the magnitude of AC component of one or both counterpropagating lightwave(s). The particular method used to form the SBS signal is beyond the scope of this invention.

Connected to the output of RDI control circuit 40 is a first amplifying network 44 and a second amplifying network 46. First amplifying network 44 is used to drive first transducer 20, whereas second amplifying network is used to drive second transducer 22. The first amplifying network 44 comprises an inverter 48 and an amplifier 50 wherein second amplifying network 46 comprises just a single amplifier. Both first amplifying network 44 and second amplifying network 46 are connected to the output of RDI control 40; therefore, the magnitude of their inputs are identical. Due to the influence of inverter 48 in first amplifying network 44, the output of first amplifying network 44 is equal in magnitude, but opposite in polarity with respect to the output of second amplifying network 46. This arrangement causes the simultaneous and inversely proportional movement of first transducer 20 and second transducer 22. Stated another way, when first transducer 20 is pushed in, second transducer 22 is pulled out; or alternatively, when first transducer 20 is pulled out, second transducer 22 is pushed in. This control arrangement maintains a constant separation between first transducer 20 and second transducer 22. As is well known in the art, this constant separation allows continuous pathlength control while adjusting the path traversed by the two optical signals. Adjustment of the path traversed to an optimum position increases the performance of the gyroscope and, thus, is very beneficial.

As the ring laser gyroscope 10 is subjected to high rotation rates, the SBS diminishes in amplitude. At very high input rates, the SBS diminishes to a level at which the RDI control loop is not capable of remaining closed. Therefore, at high input rates RDI control is lost.

The method of RDI control of the present invention is an extension of traditional RDI control which applies when the ring laser gyroscope is subjected to high input rates. Utilizing the control method of the present invention, traditional RDI control methodology is used when the gyro is subjected to low input rates. When the ring laser gyroscope is subjected to higher input rates, the method of the present invention assumes RDI control, thus assuring efficient and accurate performance through the entire range of possible inputs.

Figure 2:
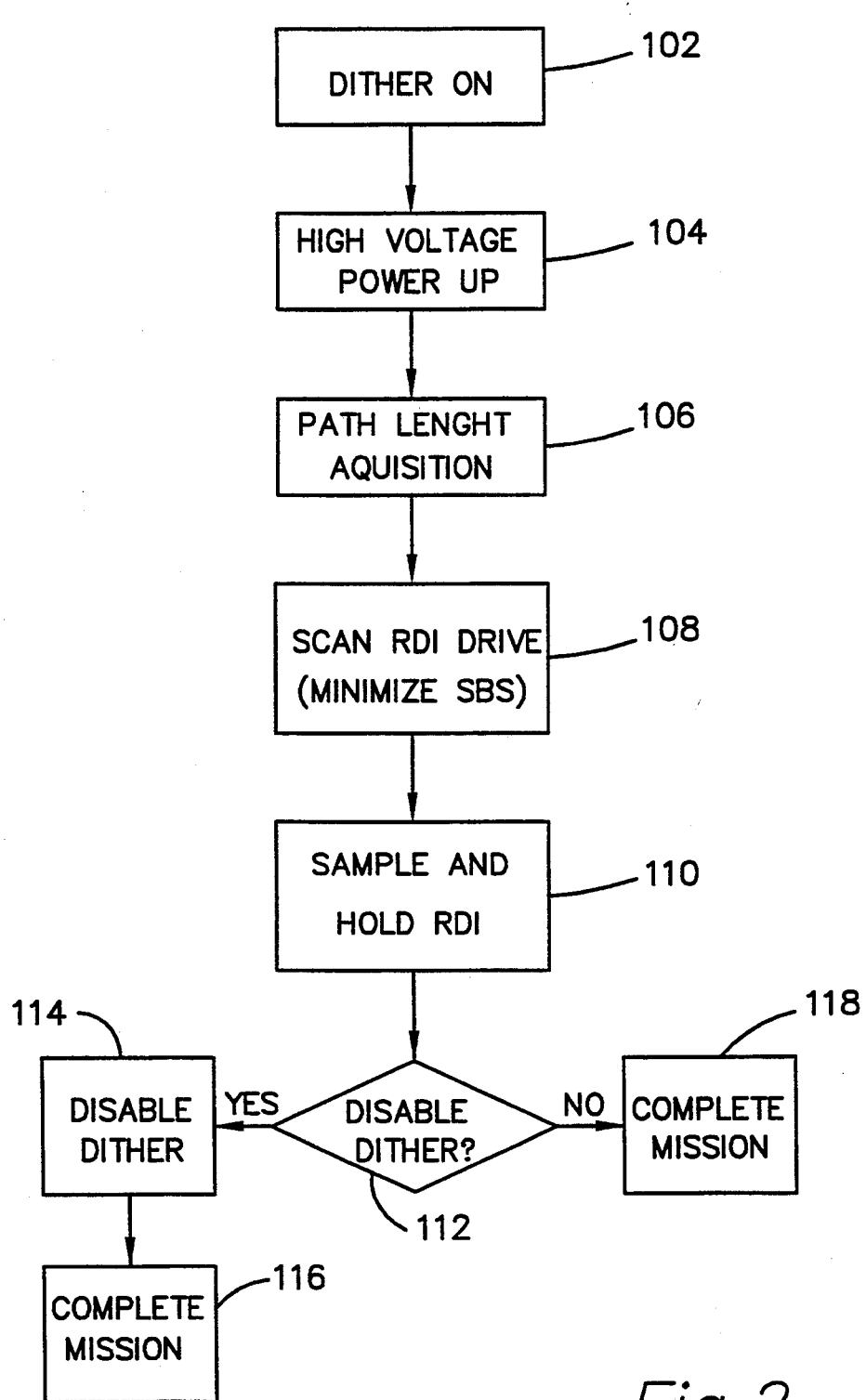
FIG. 2 is a flow diagram of the process of the present invention.

In FIG. 2, there is shown a flow chart describing one method of control utilizing the present invention. It will be understood that certain modifications to the process can be made without departing from the spirit of the present invention. In summary, the gyro is started and control of all elements is established. The RDI control then continuously monitors the RDI control positions. Prior to the introduction of high input rates, the RDI control position is sampled and then held constant throughout the mission.

Referring specifically to FIG. 2, the control process begins with a number of initialization steps, first starting with establishing dither control in block 102. This dither control includes running the dither motor at a predefined frequency to rotationally oscillate the gyro. Next, the process proceeds to the next step of high voltage power-up in block 104. High voltage power-up includes the application of a large electrical potential between a cathode and an anode to establish a gas discharge laser within ring laser gyro block 10. Dither start-up and high voltage power-up are both well known in the art.

The next step involves the establishment of pathlength control. Again, pathlength control methodologies are also well known in the art. Next, at block 108 the SBS is minimized by scanning the range of RDI control positions. Numerous methods of scanning RDI are possible, including a sweep scan across the entire RDI window, or other appropriate RDI scan methodologies. Once the RDI control position which minimizes SBS is established, the control position is continuously monitored by RDI control 40. RDI control 40 maintains the RDI control position at a point which minimizes SBS.

At some point it is necessary to signal to RDI control 40 that the current RDI control position should be held. One method of such signaling is for a mission control signal to send a signal indicating that high rates are about to be encountered. This will cause RDI control 40 to sample its last RDI control position and hold it constant until a time at which the system will no longer experience high rates (again, likely to be signaled from a mission control system).

Alternatively, RDI control 40 could monitor the gyroscope output and sense when high input rates are encountered. When rotation rates are measured above a predetermined level, RDI control 40 will sample its current control position and hold that control position constant. When rotation rates are measured below the predetermined level, RDI control 40 can then return to its conventional control methods.

Next, in block 112 the control device of the present invention must determine whether it is desired to disable the dither motor, or to maintain ring laser gyroscope dithering. Disabling the dither motor may have certain advantages in certain applications, whereas it will not be advantageous in others. If it is desired to disable the dither motor, the process proceeds to block 114 where the dither is disabled and the mission is completed as shown in block 116. However, if dithering is desired throughout the complete mission, the dithering of the ring laser gyro block is continued and the process moves onto block 118 where the mission is completed.

The control method of the present invention comprises a realization that at high rates the typical RDI control methodologies cannot work due to the diminishing amplitude of the SBS. By sampling and holding the RDI control position, immediately prior to the subjection of the ring laser gyro block to high input rates, the RDI will be held at its optimum control position, thus improving the performance of the ring laser gyroscope. The primary improvement of the present invention is in the enhancement of scale factor linearity at higher input rates. Scale factor linearity is improved due to the tuning of the RDI control to its optimum control position and maintaining the RDI at that optimum control position throughout operation at high rates.

Lastly, it is noteworthy that the process of control of the present invention can help to improve factory yields in the production of ring laser gyroscopes. More specifically, the control process of the present invention will help to improve gyro performance, thus allowing more gyroscopes produced to meet any specification requirements necessary.

Figure 3:
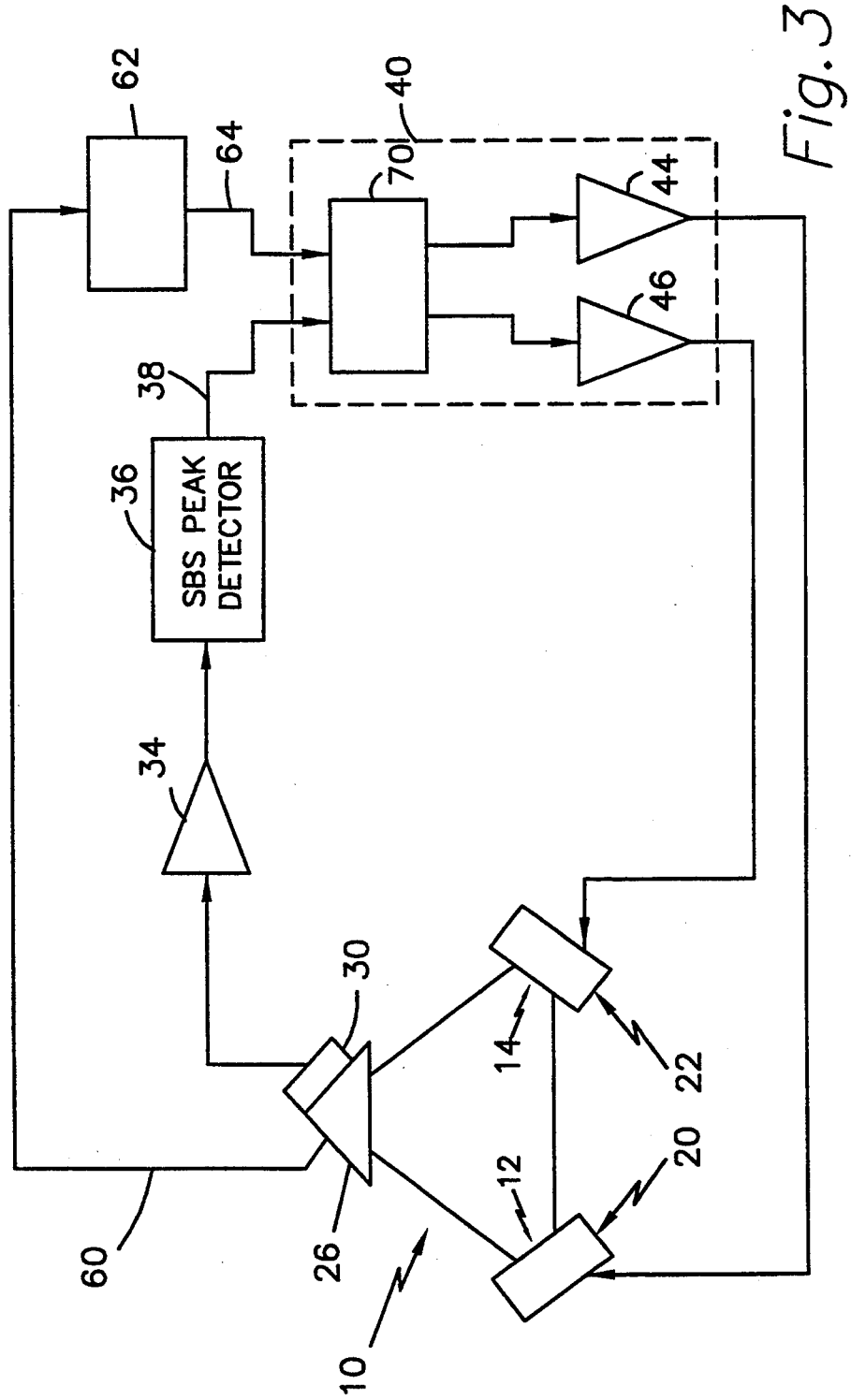
FIG. 3 is a block diagram of the RDI control utilized in the present invention.

It will be understood by those skilled in the art that RDI control 40 may take on many configurations. FIG. 3 illustrates one possible configuration for RDI control 40 wherein like elements have retained their reference numbers. An output signal 60 is output from corner cube 26. Output signal 60 contains information regarding the combined optical signals from ring laser block 10 and is provided to a rate determining block 62 for determining the rate of rotation. Rate determining block 62 receives output signal 60 and, through appropriate manipulation, outputs a rate signal 64 to RDI control 40.

In the embodiment of RDI control 40 of FIG. 3, a processor 70 receives rate signal 64 and SBS peak signal 38. Processor 70 can interpret rate signal 64 and determine which mode of control should be used (i.e., either traditional RDI control or the sample and hold control). Processor 70 then outputs appropriate signals to first amplifying network 44 and second amplifying network 46. First transducer 20 and second transducer 22 are then appropriately positioned in response to first amplifying network 44 and second amplifying network 46.

Note that two signals are output from processor 70. A single output could also be utilized as shown in FIG. 1; however, the use of two outputs provides individual control of first transducer 20 and second transducer 22.

Having described the present invention in considerable detail, it should be apparent to those skilled in the art that numerous modifications and alterations can be made, and further advantages may be found. We claim all modifications coming within the scope and spirit of the present invention as defined in the following claims.

What is claimed is:

1. An apparatus for improving the performance of a ring laser gyroscope, the gyroscope for sensing an inertial rotation input rate and having a gyro block for supporting a first counterpropagating optical signal and a second counterpropagating optical signal, the gyroscope further having a first mirror transducer and a second mirror transducer, the mirror transducers for adjusting the path of the first counterpropagating optical signal and the second counterpropagating optical signal, the apparatus comprising:

sensing means for sensing the amplitude of a single beam signal, the single beam signal indicative of the ac component of the first counterpropagating signal, the sensing means for outputting a signal indicative of the single beam signal;

mode control means for transmitting a mode signal indicative of the desired control method, the mode control means responsive to the inertial rotation input rate; and control means for receiving the single beam signal and the mode control signal transmitting an RDI control signal to the first mirror transducer and the second mirror transducer in response to the single beam signal and the mode control signal, wherein the RDI control signal is adjusted to minimize the single beam signal if the mode control signal indicates that the inertial input rate is below a predetermined value and the RDI control signal is held at a constant if the inertial rotation input rate is above the predetermined value.

2. The apparatus of claim 1 wherein the sensing means is an optical detector having a detector output, the detector output connected to an amplifier, the amplifier having an output connected to an SBS peak detector for detecting a peak to peak amplitude of a signal received at an input and producing an output indicative of the peak to peak amplitude.

3. The apparatus of claim 1 wherein the control means is a processor.

4. The apparatus of claim 1 further comprising a monitoring means for continuously monitoring the RDI control signal and storing the value of the RDI control signal while the mode control signal indicates the inertial rotation input rate is below the predetermined value.

5. The apparatus of claim 4 wherein when the mode control signal indicates the inertial input rate is above the predetermined value, the RDI control signal is held at a constant, the constant being equal to the last stored RDI control signal stored by the monitoring means.

6. The apparatus of claim 1 wherein the mode control means comprises a readout means attached to the gyroscope for outputting a rate signal indicative of the inertial input rate, the mode control means attached to the readout means so as to receive the rate signal and output the mode signal according to the received rate signal.

7. A method for improving the performance of a ring laser gyroscope during the input of high rotation rates, comprising the steps of:

running the gyroscope so as to produce a readout signal and an single beam signal, including running a dither mechanism;

operating an RDI control loop so as to minimize the single beam signal;

sampling the RDI control loop immediately prior to the introduction of a rotation rate above a predetermined level and holding the RDI control loop constant;

disabling the dither motor; and running the gyroscope during the period where the rotation rate is above the predetermined level so as to produce the readout signal indicative of the input rotation rate.

8. The method of claim 7 wherein the operation of the RDI control loop includes sampling the single beam signal and transmitting a control signal to a first mirror transducer and a second mirror transducer, the control signal for causing the repositioning of the first mirror transducer and the second mirror transducer.

9. A control method for improving the scale factor linearity of a ring laser gyroscope, the gyroscope having a block for supporting two counterpropagating optical signals, the gyroscope further having a first mirror transducer and a second mirror transducer for adjusting the path about which the two optical signal propagate, the method comprising the steps of:

operating the gyroscope prior to the introduction of an input rate, including operating a random drift improvement circuit so as to control the first mirror transducer and the second mirror transducer and position them in optimum control positions;

sampling the control positions of the first mirror transducer and the second mirror transducer; and holding the first mirror transducer and the second mirror transducer in constant positions during periods in which the gyroscope is subjected to input rates above a predetermined level.

10. The control method of claim 9 wherein operating the gyroscope further includes energizing a dither motor to rotationally oscillate the gyroscope.

11. The control method of claim 10 wherein the dither motor is disabled during the periods in which the gyro is subjected to input rates above a predetermined level.

12. The control method of claim 9 wherein the step of operating the gyroscope includes generating two counter propagating optical signals within the gyroscope, the two optical signals generated by establishing a gas discharge laser within the gyroscope.

13. The control method of claim 12 wherein the gyroscope generates a single beam signal indicative one of the counter propagating optical signals.

14. The control method of claim 13 wherein the first transducer and the second transducer are positioned such that the single beam signal is minimized.

15. A method of random drift improvement control for a ring laser gyroscope, the method comprising the steps of:

operating the gyroscope to produce a readout signal indicative of an inertial input rotation rate sensed by the gyroscope, also to produce a single beam signal indicative of an AC intensity level of a counterpropagating optical signal within the gyroscope;

operating an RDI control loop to adjust a path traversed by the counterpropagating optical signal so as to minimize the single beam signal; monitoring the readout signal; and disabling the RDI control loop and holding the path traversed constant when the readout signal indicates the inertial input rate is above a predetermined level.

* * * * *